United States Patent [19]

Schwarz

[11] 4,333,121

[45] Jun. 1, 1982

[54] FUSED STATION PROTECTOR

[75] Inventor: Alfred O. Schwarz, Parsippany, N.J.

[73] Assignee: Bell Telephone Laboratories, Incorporated, Murray Hill, N.J.

[21] Appl. No.: 178,526

[22] Filed: Aug. 15, 1980

[51] Int. Cl.$^3$ .............................................. H02H 85/44

[52] U.S. Cl. ...................................... 361/104; 361/119

[58] Field of Search .......................... 361/55, 104, 124; 337/31, 33, 34, 276, 278; 200/151

[56] References Cited

U.S. PATENT DOCUMENTS

| | | | |
|---|---|---|---|
| 1,862,317 | 6/1932 | Ringwald | 361/104 X |
| 2,600,407 | 6/1952 | Kelsay | 337/34 X |
| 3,281,555 | 10/1966 | Fister | 337/276 X |
| 3,448,341 | 6/1969 | Casey | 337/31 X |
| 3,600,634 | 8/1971 | Muench, Jr. | 361/55 |
| 3,760,227 | 9/1973 | Poindexter | 361/104 X |
| 3,929,660 | 12/1975 | Khalid | 200/151 X |

FOREIGN PATENT DOCUMENTS

| | | | |
|---|---|---|---|
| 420008 | 9/1971 | U.S.S.R. | 337/276 |

*Primary Examiner*—Harry E. Moose, Jr.
*Attorney, Agent, or Firm*—Jack S. Cubert; Kurt C. Olsen

[57] ABSTRACT

Apparatus for the electrical protection of communication circuits includes an insulative base (e.g., 13) having a line terminal (e.g., 3) and a station terminal (e.g., 1). A fuse wire (e.g., 2) is enclosed within a cavity (e.g., 21) within the base (e.g., 13). The fuse wire (e.g., 2) is connected in series between the line terminal (e.g., 3) and the station terminal (e.g., 1). The cavity (e.g., 21) is filled with an arc-extinguishing material (e.g., 22) to prevent a power arc when the fuse wire (e.g., 2) melts.

4 Claims, 3 Drawing Figures

FUSED STATION PROTECTOR

BACKGROUND OF THE INVENTION

My invention relates to the electrical protection of communication circuits and, more particularly, to improved fusing for current overload protection.

Occasional faults in telephone lines outside of customer premises occur due to lightning strikes and other phenomenon. In order to safeguard a customer telephone station from such hazards, a station protector located on the customer premises is used to interface the outside telephone line to the station line. A station protector usually employs known carbon-block, air-gap, or gas-tube devices for voltage overload protection. Current overload protection is typically effected by fusing. A station protector fuse must be able to reliably interrupt an alternating current of at least 350 amperes at 3000 volts. When a fuse wire melts, a gap results which is susceptible to a potentially destructive power arc. A power arc occurs when the path across the gap ionizes. The voltage at which ionization occurs decreases as the length of the gap decreases. The maximum voltage rating of a fuse thus corresponds nominally to the length of the gap.

Due to manufacturing and installation considerations, it is desirable to shrink the fuse length without lowering the voltage rating of the fuse. One arrangement encloses the fuse wire inside a tube filled with sand. The sand acts as an arc suppressant so that a fuse length of about four inches offers the aforementioned degree of electrical protection. Modern construction trends toward out-of-sight equipment installation, however, now demand even more compactly designed fused station protectors. Contemporary fused station protectors also have increased manufacturing costs because of the many mounting parts required for replaceable fuses. Replaceable fuses are unnecessary, however, since field experience has shown that the occurrence of a blown fuse is rare; it is economically desirable to treat the entire protector as an expendable unit. It is therefore an object of the invention to provide a compact, expendable fused station protector.

SUMMARY OF THE INVENTION

The invention is directed to apparatus for the electrical protection of a circuit. An insulative base has a line terminal connected to the line side of the circuit and a station terminal connected to the station side of the circuit. A fuse wire is connected in series between the line terminal and the station terminal. The fuse wire is enclosed within a cavity in the base. The cavity is filled with an arc-extinguishing material. The arc-extinguishing material is operative to absorb the energy from a melting fuse wire to prevent the formation of a power arc.

DETAILED DESCRIPTION

Figure 1:
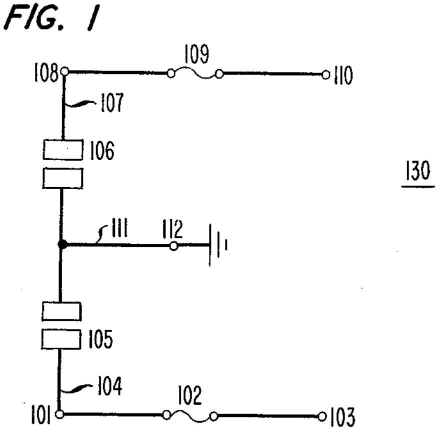
FIG. 1 is an electrical schematic of one embodiment illustrative of the invention.

Referring to FIG. 1, the electrical schematic of a fused station protector 130 comprises a fuse wire 102 connected in series between a station terminal 101 and a line terminal 103. A fuse wire 109 is similarly connected in series between a station terminal 108 and a line terminal 110. One side of a voltage overload protector 105 is connected to station terminal 101 by a conductor 104. The other side of voltage overload protector 105 is connected to a ground terminal 112 by a conductor 111. One side of a voltage overload protector 106 is connected to station terminal 108 by a conductor 107. The other side of voltage overload protector 106 is connected to ground terminal 112 by conductor 111.

Figure 2:
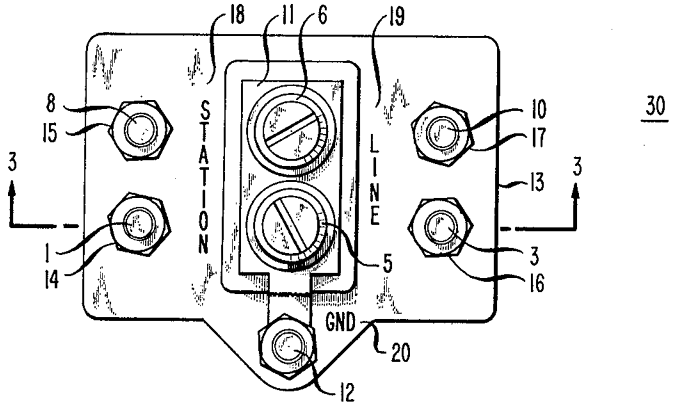
FIG. 2 is a top orthogonal view according to the embodiment of FIG. 1.

Referring to FIG. 2, fused station protector 30 comprises a base 13 which holds station terminals 1 and 8, and line terminals 3 and 10. The station and line terminals provide attachment points for wire conductors (not shown). Advantageously, nuts 14, 15, 16, and 17 are operable to secure the wire conductors to the station and line terminals. The top side of voltage overload protector 5 connects electrically with ground terminal 12 through conductor 11. The top side of voltage overload protector 6 is similarly connected to ground terminal 12 through conductor 11. Base 13 has indicia 18 which visually designate station terminals 1 and 8 of fused station protector 30. Similarly, indicia 19 designate line terminals 3 and 10 of fused station protector 30; indicia 20 designate ground terminal 12 of fused station protector 30.

Figure 3:
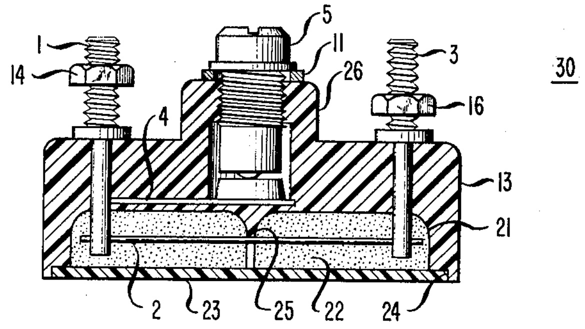
FIG. 3 is a broken-out section front view along line 3—3 of the embodiment of FIG. 2.

Referring to FIG. 3, station terminal 1 and line terminal 3 both extend through base 13 of fused station protector 30 into a cavity 21 within the base. Fuse wire 2 is mechanically and electrically connected at one end to the bottom of station terminal 1. The other end of fuse wire 2 is mechanically and electrically connected to the bottom of line terminal 3. Cavity 21 is filled with an arc-extinguishing material 22. Arc-extinguishing material 22 is retained within cavity 21 by a cover 23. Cover 23 mechanically engages a slot 24 in the bottom of base 13. Cavity 21 has a pinched portion 25 which constricts the arc path to assist power-arc suppression. The top side of voltage overload protector 5 is mechanically engaged to a raised portion 26 of base 13. The bottom side of voltage overload protector 5 is electrically connected to one end of conductor 4. The other end of conductor 4 is mechanically and electrically connected to station terminal 1.

The above-described arrangement for fuse wire 2 is substantially duplicated for fuse wire 9. A second cavity (not shown) within base 13 encloses fuse wire 9. The second cavity is also filled with an arc-extinguishing material.

In particular, a material comprising a powdered form of Firebrake ZB has been found to be a very effective arc-extinguishing material. Firebrake ZB is made by the United States Borax and Chemical Corporation of Los Angeles, Calif., and has the formula $2ZnO.3B_2O_3.3.5H_2O$.

While the invention has been shown and described with reference to particular embodiments thereof, it is to be understood that numerous changes may be made in form and details without departing from the spirit and scope of the invention. For example, the insulative base may be enlarged to accommodate a plurality of fuse wires for protecting a plurality of stations. Also, the base may include means to electrically ground or open a line if the corresponding voltage overload protector is inadvertently left out. The arc-extinguishing material Firebrake ZB may also be used in granular and other alternative forms.

I claim:

1. A circuit protector comprising an insulative base having an elongated cavity, the cavity being shaped to have a pinched portion between two end portions, a line terminal held within the base and protruding into one end portion of the cavity, a station terminal held within the base and protruding into the other end portion of the cavity, a fuse wire connected between the line and station terminals within the cavity, and an arc-extinguishing material which fills the cavity and surrounds the fuse wire.

2. Apparatus according to claim 1 further comprising a ground terminal held within the base and positioned between the line and station terminals, a voltage overload protector held within the base adjacent to the ground terminal, a first conductor embedded within the base and connected between the station terminal and one side of the voltage overload protector, and a second conductor contiguous with the surface of the base and connected between the ground terminal and the other side of the voltage overload protector.

3. Apparatus according to claim 1 further characterized in that said arc-extinguishing material (22) has the formula $2ZnO.3\text{-}B_2O_3.3.5H_2O$.

4. Apparatus according to claim 1 further characterized in that said arc-extinguishing material (22) is in primarily powdered form.

* * * * *